April 16, 1963 L. E. MYLTING 3,085,831
FINE SOLIDS TRANSFERRING DEVICE AND METHOD
Filed Oct. 16, 1961
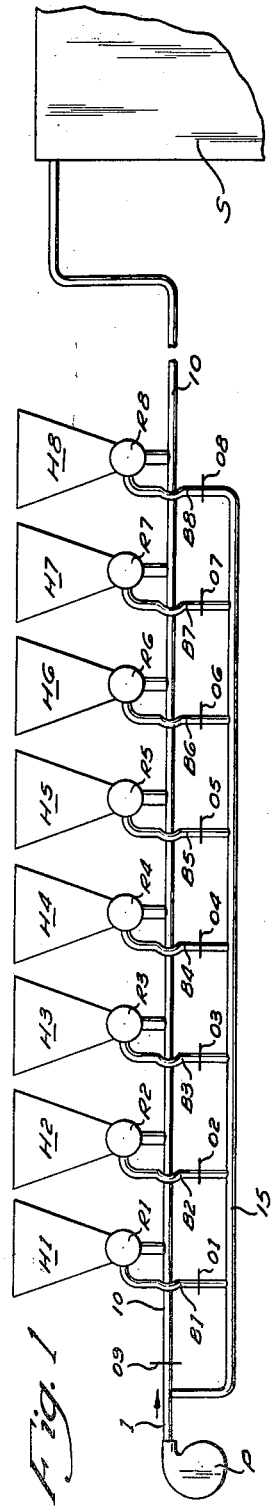
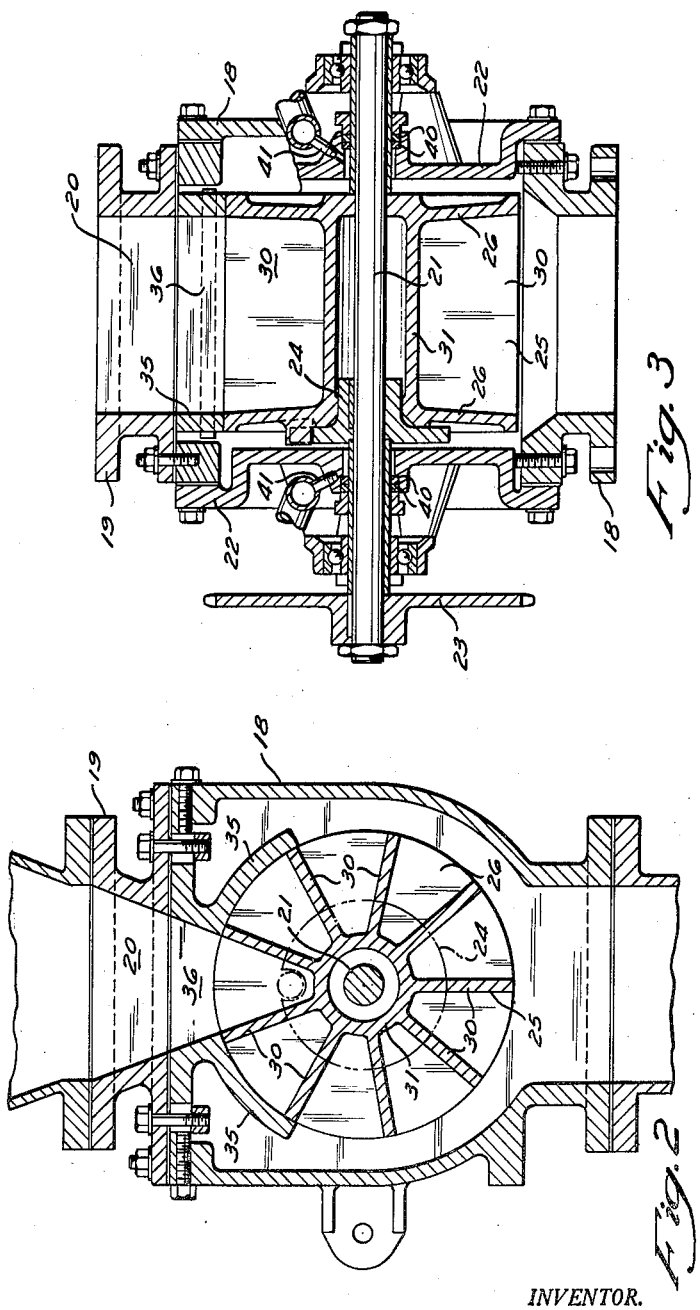
INVENTOR.
LAURITZ E. MYLTING
BY
WATTS, EDGERTON, PYLE & FISHER
ATTORNEYS

United States Patent Office 3,085,831
Patented Apr. 16, 1963

3,085,831
FINE SOLIDS TRANSFERRING DEVICE
AND METHOD
Lauritz Emil Mylting, Ardmore, Pa., assignor to
The Allen Sherman Hoff Company
Filed Oct. 16, 1961, Ser. No. 145,164
5 Claims. (Cl. 302—27)

This invention relates generally to the handling of fine solids and is particularly concerned with a new method of, and new apparatus for, simultaneously transferring fine solids from a plurality of hoppers through a conduit by an air stream.

Apparatus has been constructed heretofore for pneumatically conveying, by pressure above atmospheric, fine solids from a hopper through a conduit but, so far as I am aware, such apparatus was not adapted to conveying such solids from a multiplicity of hoppers at a time. At each rotary valve a quantity of air is lost from the conveyor line by displacement and leakage through the rotary feeder valve.

Many plants, such as power plants, are equipped with a plurality of hoppers in which fine solids are collected. It would be quite desirable to remove the solids from a considerable number of such hoppers at the same time and without loss of efficiency or improper functioning of the system.

The present invention aims to satisfy that demand and achieves that object by the new method and the new means disclosed herein.

This invention will be better understood by those skilled in the art from the following description and the accompanying drawing constituting parts of this specification.

In the drawings:

FIG. 1 is a schematic view of a preferred form of apparatus embodying the present apparatus invention and suitable for carrying out the present invention;

FIGS. 2 and 3 are, respectively, central and transverse views through a rotary solids feeder adapted for use with the apparatus of FIG. 1.

In the drawings H1 to H8 indicate dust collecting hoppers arranged in close proximity to one another, the hoppers being provided with rotary feeders R1 to R8, respectively, with each feeder being connected to a conduit 10 which at one end is connected to an air pump P of any conventional type and at the other end to a receptacle S for dust, such as a silo S. An auxiliary conduit 15 extends from conduit 1 adjacent to air pump P and has branches B1 to B8 connected, respectively, to each of the feeders R1 to R8. The branches B1 to B8 are provided with adjustable orifices O1 to O8, respectively, by means of which the volumes of air flowing through the several branches may be regulated. Main conduit 10 has an adjustable orifice O9 positioned beyond the outlet into auxiliary conduit 15 and serves to control the volume of air passing through the conduit and beneath the several feeders, and to maintain pressure in conduit 15 higher than the pressure in conduit 10.

In FIGS. 2 and 3 is shown a conventional rotary feeder, which may be representative of the feeders R1 to R8, this feeder having been altered for purpose of the present invention.

Since feeders R1 to R8 are alike, only one need be described. The feeder of FIGS. 2 and 3 comprises a housing 18 which is attached to the lower end of a filler plate 19 which, in turn, is connected to the hopper and has a passage 20 connecting the interior of the hopper and of the housing, through which fine solids may flow from the hopper into the housing. A shaft 21 extends through the end covers 22 of the housing and this shaft is mounted in conventional roller bearings carried by these covers and with a driven sprocket 23 on one end thereof. A drive flange 24 is keyed to shaft 21 and a rotor 25 is mounted on shaft 21 and flange 24 for rotation therewith. The rotor is provided with disc-shaped end plates 26 and radial, axially extending walls 30 which are connected to a hollow hub 31 of the rotor and to the end plate 26. The hub 31, walls 30 and plates 26 form a plurality of radial pockets in which solids flowing out of the hopper may lodge. A shoe 35 is positioned in the upper end of the housing 18 and includes a portion having an arcuate lower surface conforming to the periphery of the rotor and being axially coextensive with the rotor. The shoe is provided with a downwardly tapering passage 36 which constitutes a continuation of the dust flow passage 20 from the hopper and serves to direct dust into the sprocket of the rotor as it is rotated. The glands 40 in each of the cover plates are opened up for free flow of air therethrough and are provided with pipes 41 which are connected to a branch line from conduit 15 to the rotor.

The operation of the above described apparatus is substantially as follows.

With quantities of finely divided solids in each of the several hoppers H1 to H8, inclusive, the air pump P is actuated to deliver a stream of high pressure air through main conduit 10 and auxiliary conduit 15. The orifice O9 is adjusted to reduce the air pressure in line 10 to less than the air pressure in line 15. However, the air flowing in conduit 10 is maintained at a pressure sufficiently high to entrain fine solids discharged thereinto by the several rotary feeders and to carry such solids to the storage chamber in silo S. Each of the orifices O1 to O8 in branch lines B1 to B8 is so adjusted that the air streams flowing into each of the rotors R1 to R8 will be substantially uniform.

While the rotary feeders are rotating and feeding finely divided solids out of the several hoppers and into conduit 10, air streams will be flowing through the various branches B1 to B8 into the several feeders through the pipe lines 41. This air serves not only to purge the glands of dust but is also adjusted to compensate for the air loss through the rotary feeder. Air entering the discharge passage from the hopper will fluidize the fine solids in the hoppers and facilitate their flow into the rotary feeders and will tend to maintain the same air weight flow throughout conduit 10 no matter how many rotary valves feed into this conduit. Since the feeders may be rotated at desired speeds, the rate of flow of solids out of several hoppers may be readily controlled. Such control together with the control exercised by orifices O1 to O9 will result in the air stream flowing in conduit 1 being used to approximately its maximum solids-carrying capacity at all points in conduit 10.

In the conventional systems, air flow will progressively decrease at each rotary feeder, thus requiring excessive flow rate at the upstream end of the line to maintain adequate velocity at the downstream end of the line.

In the present invention the constant flow of controlled amounts of air into each of the rotary feeder housings will compensate for the loss of air by leakage of each rotary feeder. The flow rate of air at each of the feeders will be maintained substantially constant by regulation of the adjustable orifices O1 to O9 inclusive and, as a result, the pressure and rate of flow of the air stream through conduit 10 will be maintained substantially constant through the entire time during which solids are being discharged from any one or more of the several hoppers. In this manner the quantity and velocity of air flow past the last hopper on the line, as H8, will be substantially the same as that past hopper H1 or any of the other hoppers not only during the time each of the rotary feeders is feeding solids from its hopper but also after one or more of the hoppers emptied.

Although the presently disclosed embodiment of this invention employs a single air pump P to supply air to both pipe lines 10 and 15, it will be understood by those skilled in the art that this air pump P may be replaced by two similar pumps connected respectively to pipe lines 10 and 15. In that event the adjustable orifice O9 may be omitted.

Having thus described this invention in such full, clear, concise and exact terms as to enable any person skilled in the art to which it pertains to make and use the same, and having set forth the best mode contemplated of carrying out this invention, I state that the subject matter which I regard as being my invention is particularly pointed out and distinctly claimed in what is claimed, it being understood that equivalents or modifications of, or substitutions for, parts of the above specifically described embodiment of the invention may be made without departing from the scope of the invention as set forth in what is claimed.

What is claimed is:

1. Apparatus for handling fine solids comprising:
   (a) a plurality of hoppers for fine solids having discharge openings in their lower ends,
   (b) feeder housings at the lower ends of the hoppers and having openings in their upper ends to receive fine solids from the hoppers and having open lower ends,
   (c) rotary feeders in said housings,
   (d) a storage chamber,
   (e) a main conduit connected to the lower ends of the said housings to receive solids therefrom and connected to said storage chamber,
   (f) a secondary conduit having branches opening into the several housings between their upper and lower ends,
   (g) means for causing air to flow through said main conduit at a pressure sufficiently high to entrain solids discharged from said housings and to carry the solids to said chamber,
   (h) and means for causing air to flow through said branches and into said housings at a pressure higher than the pressure in the main conduit.

2. Apparatus for handling fine solids comprising:
   (a) a plurality of hoppers for fine solids having discharge openings in their lower ends,
   (b) feeder housings at the lower ends of the hoppers and having openings in their upper ends to receive fine solids from the hoppers and having open lower ends,
   (c) rotary feeders in said housings,
   (d) a storage chamber,
   (e) a main conduit connected to the lower ends of the said housings to receive solids therefrom and connected to said storage chamber,
   (f) a secondary conduit having branches opening into the several housings between their upper and lower ends,
   (g) single means for causing air to flow through said main and secondary conduits,
   (h) adjustable orifice means to regulate the air flow through the main conduit at a pressure sufficiently high to entrain solids discharged from said housings and to carry the solids to said storage chamber,
   (i) and adjustable orifice means to regulate the air flow through said branches and into said housings at a pressure higher than the pressure in the main conduit.

3. Apparatus for handling fine solids comprising:
   (a) a plurality of hoppers for fine solids having discharge openings in their lower ends,
   (b) feeder housings at the lower ends of the hoppers and having openings in their upper ends to receive fine solids from the hoppers and having open lower ends,
   (c) rotary feeders in said housings,
   (d) a storage chamber,
   (e) a main conduit connected to the lower ends of the said housings to receive solids therefrom and connected to said storage chamber,
   (f) a secondary conduit having branches opening into the several housings above the openings in their lower ends,
   (g) means for causing air to flow through said main conduit at a pressure sufficiently high to entrain solids discharged from said housings and to carry the solids to said storage chamber,
   (h) and adjustable means to regulate air flow through said branches and into said housings at a pressure sufficiently high to compensate for loss of air from the main conduit through the housings and into the hoppers.

4. Apparatus for handling fine solids comprising:
   (a) a plurality of hoppers for fine solids having discharge openings in their lower ends,
   (b) feeder housings at the lower ends of the hoppers and having openings in their upper ends to receive fine solids from the hoppers and having open lower ends, shafts carried by said housings,
   (c) rotary feeders on said shafts in said housings,
   (d) a storage chamber,
   (e) a main conduit connected to the lower ends of the said housings to receive solids therefrom and connected to said storage chamber,
   (f) a secondary conduit having branches opening into the several housings adjacent to the said shafts,
   (g) means for causing air to flow through said main conduit at a pressure sufficiently high to entrain solids discharged from said housings and to carry the solids to said storage chamber,
   (h) and means for causing air to flow through said branches and into said housings at a pressure higher than the pressure in the main conduit.

5. Apparatus for handling fine solids comprising:
   (a) a plurality of hoppers for fine solids having discharge openings in their lower ends,
   (b) feeder housings at the lower ends of the hoppers and having openings in their upper ends to receive fine solids from the hoppers and having open lower ends,
   (c) rotary feeders in said housings,
   (d) a storage chamber,
   (e) a main conduit connected to the lower ends of the said housings to receive solids therefrom and connected to said storage chamber,
   (f) means for causing air to flow through said main conduits at a pressure sufficiently high to entrain solids discharged from said housings and to carry the solids to said storage chamber,
   (g) means for compensating for loss of air from the main conduit through said feeders including a secondary conduit having branches opening into the several housings above the openings in their lower ends,
   (h) and means for causing air to flow through said branches and into said housings at a pressure higher than the pressure in the main conduit.

References Cited in the file of this patent

UNITED STATES PATENTS

| | | |
|---|---|---|
| 2,030,553 | Tiley | Feb. 11, 1936 |
| 2,681,748 | Weller | June 22, 1954 |
| 2,984,521 | McCulloch | May 16, 1961 |